United States Patent
Tsirkin (10) Patent No.: US 9,355,018 B1
(45) Date of Patent: May 31, 2016

(54) HISTORY N-SECTION FOR PROPERTY LOCATION

(71) Applicant: Red Hat Israel, Ltd., Ra'anana (IL)

(72) Inventor: Michael Tsirkin, Yokneam Illit (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 0 days.

(21) Appl. No.: 14/824,728

(22) Filed: Aug. 12, 2015

(51) Int. Cl.
*G06F 9/44* (2006.01)
*G06F 11/36* (2006.01)

(52) U.S. Cl.
CPC ............ *G06F 11/368* (2013.01); *G06F 8/71* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 6,513,154 | B1 | 1/2003 | Porterfield |
| 7,506,312 | B1 | 3/2009 | Girolami-Rose et al. |
| 7,840,849 | B2 | 11/2010 | O'Callahan |
| 8,117,598 | B2 | 2/2012 | Johnson et al. |
| 8,881,095 | B1 | 11/2014 | Hunt, Jr. et al. |
| 2014/0149435 | A1 | 5/2014 | Sisman et al. |
| 2014/0325480 | A1* | 10/2014 | Bhagavatula ....... G06F 11/3688 717/124 |

FOREIGN PATENT DOCUMENTS

CN 102750153 10/2012

OTHER PUBLICATIONS

Hemmati et al., "Investigating the Effect of 'Defect Co-fix' on Quality Assurance Resource Allocation: A Search-based Approach", ScienceDirect, 2014.
Huang et al., "Performance Regression Testing Target Prioritization via Performance Risk Analysis", ICSE, May 3-Jun. 7, 2014.
Zimmermann et al., "Predicting Bugs from History", 2008, https://www.google.com/url?sa=t&rct=j&q=&esrc=s&source=web&cd=2&cad=rja&uact=8&ved=0CCUQFjAB&url=http%3A%2F%2Fwww.springer.com%2Fcda%2Fcontent%2Fdocument%2Fcda_downloaddocument%2F9783540764397-c1.pdf%3FSGWID%3D0-0-45-515407-p173780334&ei=fRInVZzoBoTJuATyuYMg&usg=AFQjCNFgzSU2W42iy_OgYhugBmyl9wqEwA&bvm=bv.93990622,d.c2E.

* cited by examiner

*Primary Examiner* — Qamrun Nahar
(74) *Attorney, Agent, or Firm* — K&L Gates LLP (57) ABSTRACT

A test system controller receives a test code having N versions, selects n intermediate versions of the test code, and tests the test code using history revision testing. The controller runs the intermediate versions in parallel, and identifies a first passed version and a first failed version from the intermediate versions. The controller then selects a subset of the N versions, the subset including N' versions between and including the first passed version and first failed version. The controller calculates a sample size, and determines whether this sample size is greater than n. Responsive to this, new intermediate versions are tested. The controller automatically performs at least a plurality of iterations of selecting and testing. Responsive to the sample size reaching a specified value, a plurality of N" versions are run in parallel, such that a passed version and a failed version are identified.

20 Claims, 5 Drawing Sheets

| Number of Versions (N) | Number of n-Sections (n) | Time per Test (hr) (T) | Expected Test Time via n-Section (hr) | Expected Test Time via Bisection (hr) | Times Faster |
|---|---|---|---|---|---|
| 10000 | 32 | 1 | 2.66 | 13.29 | 5.0 |
| 10000 | 32 | 0.5 | 1.33 | 6.64 | 5.0 |
| 10000 | 20 | 1 | 3.07 | 13.29 | 4.3 |
| 10000 | 10 | 1 | 4.00 | 13.29 | 3.3 |
| 10000 | 5 | 1 | 5.72 | 13.29 | 2.3 |
| 1000 | 32 | 1 | 1.99 | 9.97 | 5.0 |
| 1000 | 20 | 1 | 2.31 | 9.97 | 4.3 |
| 1000 | 10 | 1 | 3.00 | 9.97 | 3.3 |
| 1000 | 5 | 1 | 4.29 | 9.97 | 2.3 |
| 500 | 10 | 1 | 2.70 | 8.97 | 3.3 |
| 500 | 5 | 1 | 3.86 | 8.97 | 2.3 |
| 100 | 10 | 1 | 2.00 | 6.64 | 3.3 |
| 100 | 5 | 1 | 2.86 | 6.64 | 2.3 |

FIG. 5

HISTORY N-SECTION FOR PROPERTY LOCATION

BACKGROUND

As software and other computer code is written, edited, and updated, properties may be introduced or removed from the software or other computer code. For example, when revising software there is always a possibility for unintended consequences, which may include defects, errors, or bugs. Also, for example, malicious code may introduce an undesirable property to software. Further, software properties can be desired features, such as fixes, changes, or improvements to the code. While some features can improve software, a defect can impair code from performing in a desired way, resulting in minor problems or catastrophic failures. As the size of code grows, the ability to locate the introduction or removal of a particular software property becomes more difficult. Likewise, as the number of versions and revisions of code increases, the ability to locate the introduction or removal of a particular software property becomes all the more difficult. For example, Linux has approximately ten thousand software changes between individual releases. Thus, defect location may be particularly onerous. Each and every software change could be a potential source of introduction of a defect. With increased possibility for software defects, it has become increasingly important to provide effective ways to locate the introduction of these defects. Isolating and fixing software defects, through history revision testing, takes time and computing resources. As the length of code grows, each history revision test takes more time. As the number of versions of software grows, there are more versions which need to be tested to locate a defect, or any other property, such as a fix which is desired to be applied elsewhere or to other code. Testing for software properties can often require significant computing resources and takes a significant amount of time. Bisection is one approach to locating software properties through history revision testing. For example, to locate a software defect, or a software fix, given two points in a project history (e.g., good and bad), bisection utilizes a binary search to find a defect when it is first introduced into the project. Finding a defect or malicious code can fix the problem; likewise, finding a fix may address a new problem elsewhere in the software or in other code. However, if the number of versions is large, and testing each version takes a long time, this process can be a significant drain on computing resources.

SUMMARY

The present disclosure provides a new and innovative method and system for locating software properties based on history n-section. For example, method includes receiving a test code with N versions, selecting n intermediate versions of the test code, and testing the test code using history revision testing. The history revision testing comprises running the intermediate versions in parallel, identifying a first passed version and a first failed version, and selecting a subset of the N versions. The history revision testing further comprises calculating a sample size and determining whether the sample size is greater than n. Responsive to determining that sample size is greater than n, the history revision testing further comprises selecting and testing n new intermediate versions of the test code using history revision testing. The method further includes automatically performing at least a plurality of iterations of selecting and testing. Responsive to determining that the sample size is not greater than n, the method further includes running the subset in parallel, and identifying a passed version and a failed version.

Additional features and advantages of the disclosed method and system are described in, and will be apparent from, the following Detailed Description and the Figures.

DETAILED DESCRIPTION OF EXAMPLE EMBODIMENTS

Figure 1:
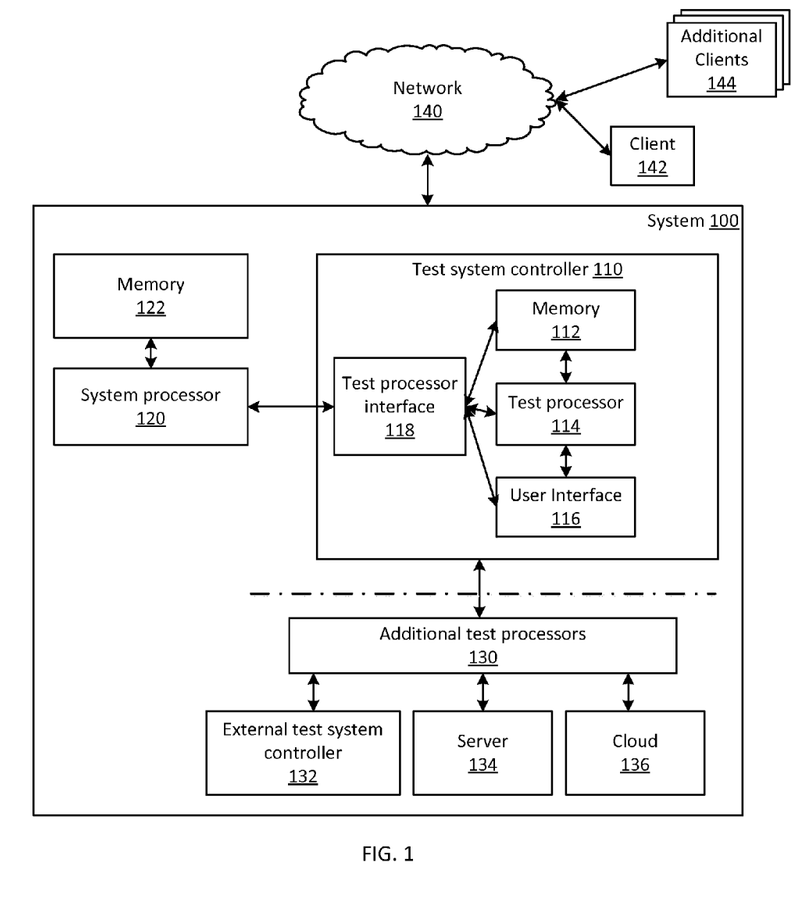
FIG. 1 is a block diagram of an exemplary system for locating a software property according to an example embodiment of the present disclosure.

FIG. 1 depicts a block diagram of an exemplary system for locating a software property according to an example embodiment of the present disclosure. The system 100 includes a test system controller 110, a system processor 120 in communication with a memory 122, and additional test processors 130. The test system controller 110 further includes a test processor 114 in communication with a memory 112, a user interface 116, and a test processor interface 118. The additional test processors 130 can include an external test system controller 132, a server 134, or a cloud 136. The system is further connected to a network 140. The network 140 is in communication with a client 142 and additional clients 144.

In an example embodiment, the client 142 may communicate via the network 140 with the system 100. For example, the network 140 may be a public network (e.g., the Internet), a private network (e.g., a local area network (LAN) or wide area network (WAN)), or a combination thereof. For example, a client (e.g., the client 142 and/or additional clients 144) may be a personal computing device, server, virtual machine, or application executing on a personal computing device, server, one or more physical processors, etc.

As used herein, a physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device or memory refers to a volatile or non-volatile memory device, such as RAM, ROM, EEPROM, or any other device capable of storing data. As discussed herein, I/O device refers to a device capable of providing an interface between one or more processor pins and an external device capable of inputting and/or outputting binary data. The system 100 can further include a computer readable medium storing instructions, which, when executed by a test system controller, cause the test system controller to operate in the ways described.

The test system controller 110 is configured to receive a test code. The test code having N versions in chronological order, wherein N is a quantity of versions. The test code can be sent from the client 142 or additional clients 144, via the network 140. The test system controller 110 is further configured to select n intermediate versions of the test code, wherein n is a quantity of intermediate versions. The system controller 110 is further configured to the test code using history revision testing.

As used herein, the N versions are also referred to as a progression of versions. The N versions in chronological order may be non-linear. Non-linearity occurs when multiple progressions of versions coexist, and progressions of versions may merge and/or diverge. Divergent progressions of versions, which may be updated in parallel, create a non-linear chronological order. For example, a first progression of versions (e.g., A, B, C, D, E) is related to a second progression of versions (e.g., A, B, C, F, G), where the progressions of versions diverge at version C, which was modified to create version D and also modified to create a separate and parallel version F, both of which were later modified to create versions E (e.g., modification of D) and G (e.g., modification of F), respectively. Thus, a chronological order of the progression of versions may be A, B, C, D, F, E, G. A different chronological order of the progression of versions may be A, B, C, F, D, E, G. Also, each of these individual divergent progressions of versions (e.g., A, B, C, F, G) may be considered a distinct chronological order. Similarly, merged progressions of versions may occur (e.g., A, B, C, D, E, and Z, Q, C, D, E). Thus, a chronological order of merged progression of versions may be Z, A, B, Q, C, D, E. A different chronological order of the progression of versions may be A, Z, Q, B, C, D, E. Also, each of the individual merged progressions of versions may be considered a distinct chronological order. In an example embodiment, the N versions in chronological order can be strictly linear (e.g., A, B, C, D, E) without any parallel version in the progression of versions.

Briefly, history revision testing can be described in the following way. The history revision testing comprises running the intermediate versions in parallel. The history revision testing further comprises identifying a first passed version, the first passed version being a last intermediate version of the intermediate versions to pass the test. The history revision testing further comprises identifying a first failed version, the first failed version being a first intermediate version of the intermediate versions to fail the test, such that the first passed version and the first failed version are consecutive versions of the intermediate versions. The history revision testing further comprises selecting a subset of the N versions, the subset including N' versions, the N' versions comprising all versions of the N versions between the first passed version and the first failed version, including the first passed version and the first failed version. The history revision testing further comprises calculating a sample size, the sample size being calculated as a total number of N' versions. The history revision testing further comprises determining whether the sample size is greater than n. Responsive to determining that sample size is greater than n, the history revision testing further comprises selecting n new intermediate versions of the test code from the N' versions and testing the new intermediate versions using history revision testing. Testing the new intermediate versions using history revision testing comprises running the new intermediate versions in parallel. Testing the new intermediate versions using history revision testing further comprises identifying a second passed version, the second passed version being a last new intermediate version of the new intermediate versions to pass the test. Testing the new intermediate versions using history revision testing further comprises identifying a second failed version, the second failed version being a first new intermediate version of the new intermediate versions to fail the test, such that the second passed version and the second failed version are consecutive versions of the new intermediate versions. Testing the new intermediate versions using history revision testing further comprises selecting a subset of the N' versions, the subset including N" versions, the N" versions comprising all versions of the N' versions between the second passed version and the second failed version, including the second passed version and the second failed version. Testing the new intermediate versions using history revision testing further comprises recalculating the sample size, the sample size being recalculated as a total number of N" versions. Testing the new intermediate versions using history revision testing further comprises, after recalculating the sample size, determining whether the sample size is greater than n. The test system controller is further configured to automatically perform at least a plurality of iterations of selecting and testing, including selecting and testing the intermediate versions and the new intermediate versions. Responsive to determining that the sample size is not greater than n, the test system controller is further configured to run the N" versions in parallel. The test system controller is further configured to identify a third passed version, the third passed version being a last version of the N" versions to pass the test. The test system controller is further configured to identify a third failed version, the third failed version being a first version of the N" versions to fail the test, such that the third passed version and the third failed version are consecutive versions of the N" versions, wherein the third failed version is a first version of the N versions that includes the software property.

In an example embodiment, the plurality of iterations further includes at least selecting n second new intermediate versions of the test code from the N" versions and testing the second new intermediate versions using history revision testing. The testing comprising running the second new intermediate versions in parallel. The testing further comprising identifying a fourth passed version, the fourth passed version being a last second new intermediate version of the second new intermediate versions to pass the test. The testing further comprising identifying a fourth failed version, the fourth failed version being a first second new intermediate version of the second new intermediate versions to fail the test, such that the fourth passed version and the fourth failed version are consecutive versions of the second new intermediate versions. The testing further comprising selecting a subset of the N" versions, the subset including N'" versions, the N'" versions comprising all versions of the N" versions between the fourth passed version and the fourth failed version, including the fourth passed version and the fourth failed version. The testing further comprising recalculating the sample size, the sample size being recalculated as a total number of N'" versions, wherein after recalculating the sample size, determining whether the sample size is greater than n.

In an example embodiment the selection of the intermediate versions of the test code further comprises determining, by the test system controller, a number of changes for each of the N versions of the test code and selecting intermediate versions of the test code, wherein each of the intermediate versions has an equivalent number of changes. Accordingly, as each of the intermediate versions is tested, in parallel, each of the tests may take approximately the same amount of time, such that the processing resources can be allocated relatively evenly. The property location process discussed above can be automated or semi-automated by the test system controller 110.

The number of n intermediate versions is largely a function of the test time T required to test an individual version, e.g., how long it takes to run a test. Additionally, the number of n intermediate versions is a function of the available processing power that will be utilized to locate the property. For example, if one personal computer is being used to test twenty intermediate versions, in parallel, it might not be practical for that household computer to run the twenty intermediate versions in parallel. Alternatively, if cloud computing is being used to test versions that individually take approximately one hour to run, it could be practical for the system 100 to run twenty, fifty, one hundred, or more intermediate versions in parallel.

Typically, the number of n intermediate versions is much smaller than the total number of versions. While the number n of intermediate versions could be limitless, from a practical standpoint, 100 may be a practical limit for typical systems. Exceeding 100 intermediate versions, the amount of processing power required to conduct the tests would typically be outweighed by the marginal improvements in property location time. In other words, there is a tradeoff between number of intermediate versions tested and the total amount of processing power required to conduct the tests.

The benefits of n-section property location are plentiful: including improved speed of locating the history revision, improved efficiency in usage of computer resources, and better allocation of current resources. Thus, n-section property location advantageously allows for locating properties at a lower cost. As an example, locating a property could be used to fix a software defect. Improved usage of computing resources is extremely beneficial with high-usage cloud computing applications.

An additional benefit for n-section property location is the ability to provide at least some type of useful search results when systems are failing, disconnecting, slowing, or otherwise straggling as the systems check versions. In the case of a straggler version, the system is incapable of testing the specific version of the software without experiencing significant problems. Sometimes, this is because the software being tested does, in fact, have a defect. Sometimes, this is caused by a network problem or some other problem unrelated to the defective version, such as poor network connectivity. As the incidence of stragglers increases (e.g., due to poor network connectivity), n-section location is more robust and becomes more advantageous than bisection.

As an illustrative example, assume there is a system which is trying to locate a property, more particularly a defect, in impaired code. Under a typical bisection method, this system will attempt to start in the middle of the versions, but may fail before providing any useful sort of information. When the system fails before determining whether the test version is a pass or a fail, the system effectively provides no information regarding the property's location. By comparison, under an n-section method, the system will test a number of intermediate versions of the software. While it may be likely that the system could have one or more tests fail before completing the testing all the intermediate versions, the system also has a high likelihood of completing the testing multiple intermediate versions. Knowing even the slightest bit of information regarding where a property is (or is not), is helpful to the system. The system can cease testing the unnecessary intermediate versions, refocus the intermediate versions, and devote the computing resources to the location where they are needed most. In other words, by providing even the slightest bit of information, the n-section method allows for the system to converge on the property. As the system converges, it may reduce the number of versions that need to be tested and devote the computing resources to those versions.

n-Section property location can be used in a number of different modalities. For example, closed-source development tools (e.g., Red Hat Developer Toolset, Microsoft Visual studio/source safe, etc.). Additionally, n-section property location can leverage cloud capabilities. Cloud vendors (e.g., Red Hat, Microsoft, etc.), have closed-source based cloud offerings that can be integrated into these tools.

In an example embodiment, this system is used in a linear or a non-linear revision history. For example the system can be used in applications for software coding, testing, updating, quality assurance, software releases, etc. n-Section process can be done on an entire set of versions of code, or a select subset from which a property is known to be located. n-Section process can be done on a set of code which has gone through multiple merges of different versions, to locate the point at which the property occurs, for example, if the version A merges with version B, and then later merges with version C, and there is a subsequent failure, it is helpful to determine whether the merge with version B or the merge with version C caused the property to be included in version A. An n-section analysis of version A can determine which merge caused the property to exist.

Figure 2:
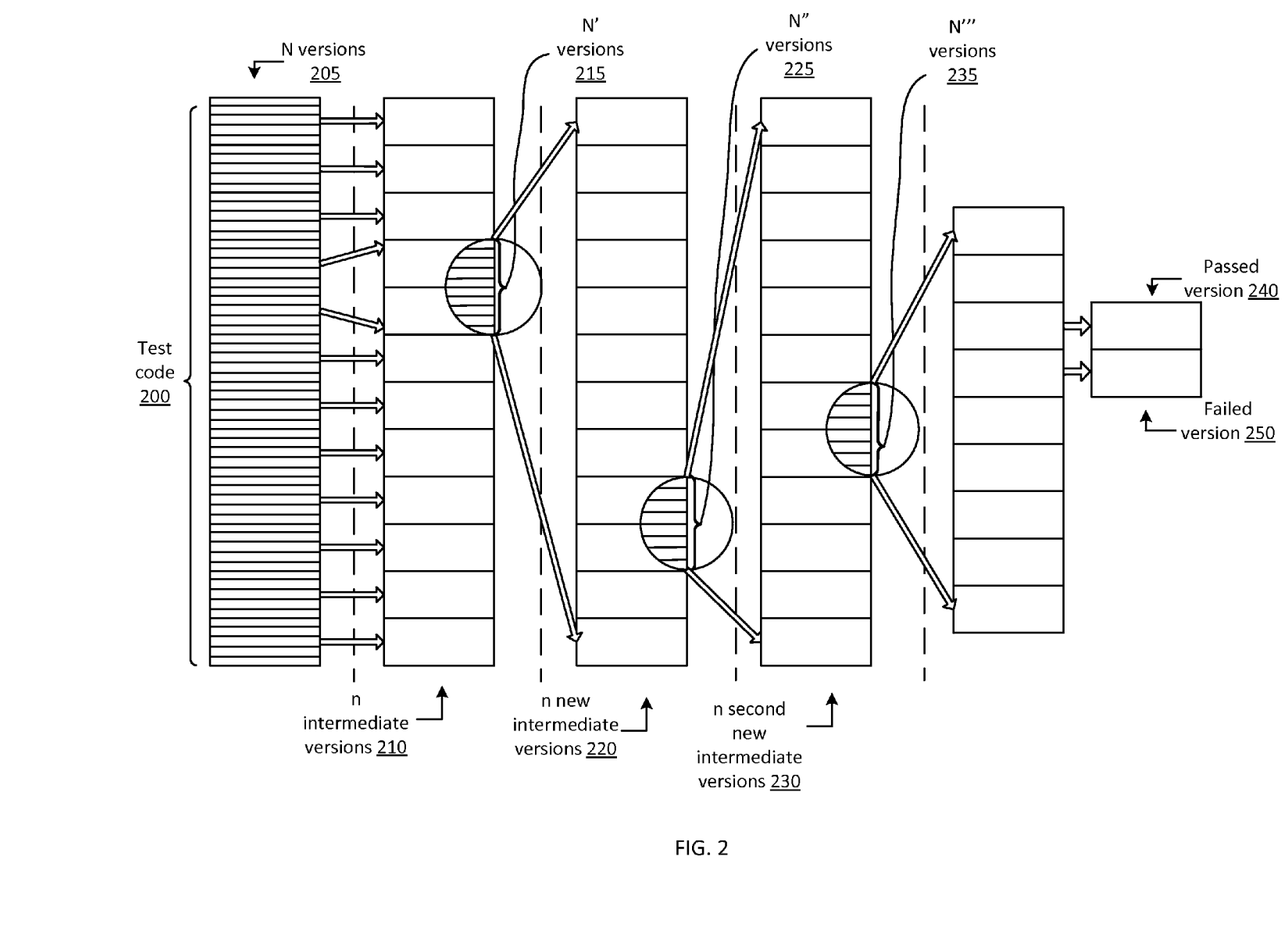
FIG. 2 is a block diagram of an example of history revision testing for locating a software property according to an example embodiment of the present disclosure.

FIG. 2 depicts a block diagram of an example of history revision testing for locating a software property according to an example embodiment of the present disclosure. This method, also referred to as n-section property location, begins with test code 200. In this example of history revision testing, the software property to be located is a software defect. The test code 200 includes N versions 205 of the test code. Each of the N versions 205 is a separate version of test code. The N versions 205 can represent coding changes, code merges, code deletions, or any other change such that the N versions 205 are different from version-to-version.

From these N versions 205, n intermediate versions 210 are selected. The n intermediate versions 210 are a plurality from the N versions 205. The n intermediate versions 210 are subsequently tested, such that n intermediate versions 210 are identified as either passed or failed versions. Passed versions are those versions which do not have a property. Failed versions, alternatively, are those versions which do have the property. Furthermore, one of the passed versions is a first passed version. The first passed version is a last n intermediate version of the n intermediate versions to pass the test. Furthermore, one of the failed versions is a first failed version. The first failed version is a first n intermediate version of the n intermediate versions to fail the test. Once the n intermediate versions 210 are identified, N' versions 215 are selected. The N' versions 215 include the first failed version, the first passed version, and all N versions 205 between the first passed version and the first failed version.

From these N' versions 215, n new intermediate versions 220 are selected. The n new intermediate versions 220 are a plurality from the N' versions 215. The n new intermediate versions 220 are subsequently tested, such that n new intermediate versions 220 are identified as either passed or failed versions. Furthermore, one of the passed versions is a second passed version; one of the failed versions is a second failed version. The second passed version is a last n new intermediate version of the n new intermediate versions 220 to pass the test. The second failed version is a first n new intermediate version of the n new intermediate versions 220 to fail the test. Once the n new intermediate versions 220 are identified, N'' versions 225 are selected. The N'' versions 225 include the second failed version, the second passed version, and all N' versions 215 between the second passed version and the second failed version.

From these N'' versions 225, n second new intermediate versions 230 are selected. The n second new intermediate versions 230 are a plurality from the N'' versions 225. The n second new intermediate versions 230 are subsequently tested, such that n second new intermediate versions 230 are identified as either passed or failed versions. Furthermore, one of the passed versions is a third passed version; one of the failed versions is a third failed version. The third passed version is a last n second new intermediate version of the n second new intermediate versions 230 to pass the test. The third failed version is a first n second new intermediate version of the n second new intermediate versions 230 to fail the test. Once the n second new intermediate versions 230 are identified, N''' versions 235 are selected. The N''' versions 235 include the third failed version, the third passed version, and all N'' versions 225 between the second passed version and the second failed version.

Furthermore, this method of history revision testing for locating a software property continues to perform this iterative analysis until a sample size, calculated by the remaining quantity of the versions (e.g., N' versions 215, N'' versions 225, N''' versions) is not greater than n. The number of iterations of history revision testing depends on the initial quantity of versions of test code, the quantity of intermediate version used, the number of failures. For example, once the sample size for N''' versions 235 is not greater than n, the method can evaluate all of the N''' versions 235 in parallel because the quantity of N''' versions 235 is less than or equal to the quantity of n intermediate versions that being tested. The N''' versions 235 are identified as either passed or failed. One of these versions, a passed version 240, is the last N''' version 235 to pass the test. One of these versions, a failed version 250, is the first N''' version 235 to fail the test. At this point, there are no more versions of software between the passed version 240 and the failed version 250, such that the failed version 250 is the version of the test code 200 that has the software property or, in this example, the software defect.

As previously noted, the software property may be a software feature or a software defect. In an embodiment, software properties are software features, such as fixes, changes, or improvements to code. In a different embodiment, software properties are software defects, such as malicious code, errors, or bugs.

In an example embodiment, this method of history revision testing for locating a software property continues to perform this iterative analysis until a sample size, calculated by the remaining quantity of the versions (e.g., N' versions 215, N'' versions 225, N''' versions) is not greater than n+2. This is because previously tested versions do not need to be retested. For example, once the sample size for N''' versions 235 is not greater than n+2, the method can evaluate all of the N''' versions 235 in parallel, excluding the first version of the N''' versions 235 and the last version of the N''' versions, because the quantity of N''' versions 235 that have yet to be tested is less than or equal to the quantity of n intermediate versions that being tested.

As an exemplary illustration, suppose that there are 1000 versions of test code (i.e., N=10000), and there are 10 intermediate versions (i.e., n=10). Through the process discussed above, in accordance with FIG. 2, the N versions are represented by the array of: [V1, V2, V3 . . . V9998, V9999, V10000]. From these N versions, the intermediate versions are selected. These intermediate versions are represented by the array of: [V500, V1500, V2500, V3500, V4500, V5500, V6500, V7500, V8500, V9500]. A first passed version and a first failed version are identified as V1500 and V2500, respectively. N' versions are then selected, as represented by the array of [V1500, V1501, V1502 . . . V2499, V2500]. From these N' versions, new intermediate versions are selected. These new intermediate versions are represented by the array of: [V1550, V1650, V1750, V1850, V1950, V2050, V2150, V2250, V2350, V2450]. A second passed version and a second failed version are identified as V1850 and V1950, respectively. N'' versions are then selected, as represented by the array of: [V1850, V1851, V1852 . . . V1949, V1950]. From these N'' versions, second new intermediate versions are selected. These second new intermediate versions are represented by the array of: [V1855, V1865, V1875, V1885, V1895, V1905, V1915, V1925, V1935, V1945]. A third passed version and a third failed version are identified as V 1925 and V 1935, respectively. N''' versions are then selected, as represented by the array of: [V1925, V1926, V1927, V1928, V1929, V1930, V1931, V1932, V1933, V1934, V1935]. From these N''' versions, third new intermediate versions are selected. These third new intermediate versions are represented by the array of: [V1925, V1926, V1927, V1928, V1929, V1930, V1931, V1932, V1933, V1934, V1935]. While the total number of N''' versions is greater than n, two of the versions (V1925 and V1935) have already been tested. In other words, while the sample size may be eleven versions, the number of versions yet to be tested is nine (excluding V1925 and V1935). Because the remaining number of versions to be tested, nine, is less than n (ten), all remaining versions can be tested in parallel. A passed version V1931 and a failed version V1932 are identified. As the failed version, V1932 is the first version of the 10000 versions tested, which has the property.

In an example embodiment, given intermediate versions represented by the array of: [V1925, V1926, V1927, V1928, V1929, V1930, V1931, V1932, V1933, V1934, V1935], there may be a straggler. For example, while testing the intermediate versions in parallel, the test system controller 110 and additional test processors 130 are unable to determine whether V1932 is a passed version or a failed version. The test system controller dynamically allocates resources such that additional processing power may be devoted to testing V1932. In this way, the parallel testing of the intermediate versions is completed in the most efficient manner.

Figure 3:
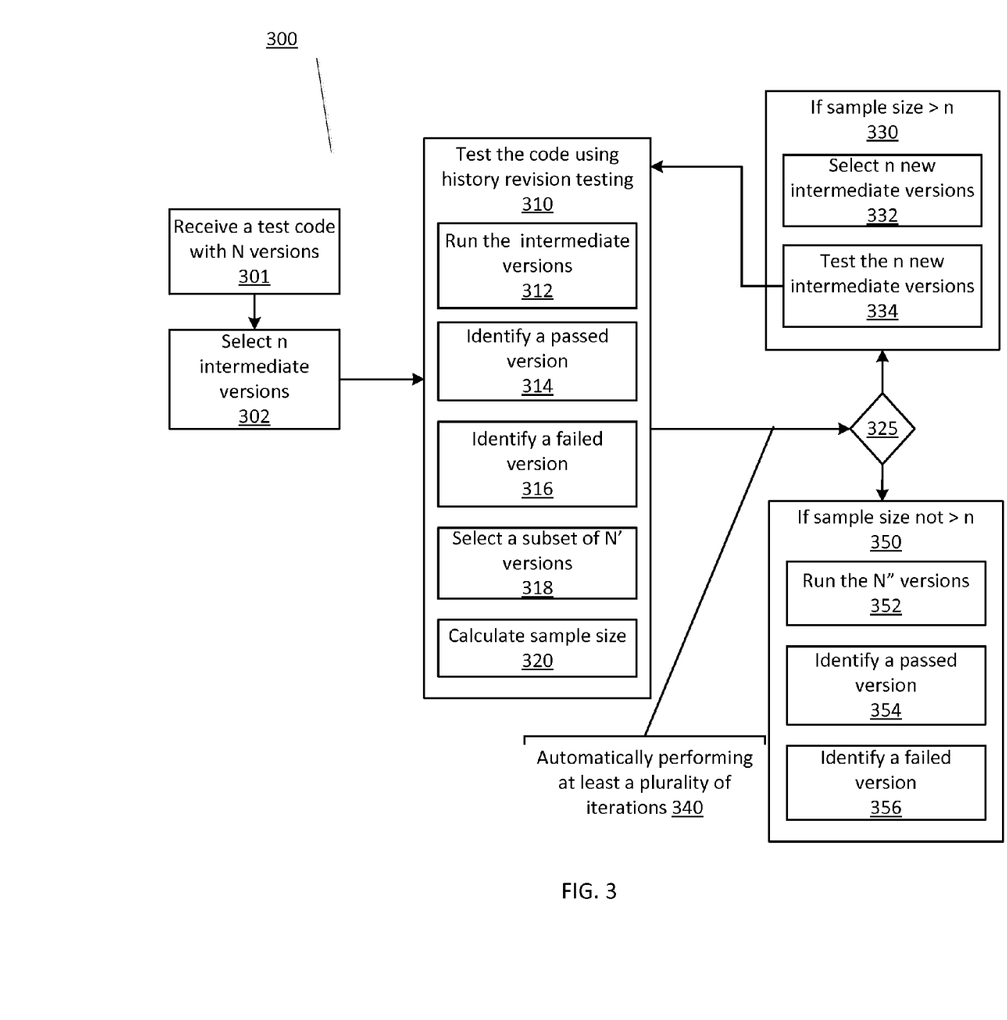
FIG. 3 is a flowchart illustrating an example method of history revision testing for locating a software property according to an example embodiment of the present disclosure.

FIG. 3 depicts a flowchart illustrating an example method of history revision testing for locating a software property according to an example embodiment of the present disclosure. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional. The method may be performed by processing logic that may comprise hardware (e.g., circuitry, dedicated logic, etc.), software, or a combination of both.

The example method, as performed by a test system controller, starts by receiving a test code (block 301), the test code having N versions. n intermediate versions of the test code are selected (block 302) from the N versions. The code is then tested, using history revision testing (block 310). This testing includes running the intermediate versions (block 312). In an example embodiment, running versions of test code includes compiling the source code for the versions of test code.

The testing further includes identifying a passed version (block 314) and identifying a failed version (block 316). The testing further includes selecting a subset of N' versions (block 318), the subset of N' versions including all N versions between the passed version and the failed version, including the passed version and the failed version. The testing further includes calculating a sample size (block 320), the sample size being a quantity of N' versions. At this point, the example method reaches a decision block (block 325). Prior to the decision block (block 325), it is noted that the testing comprises at least a plurality of iterations (via block 340).

If the sample size calculated (block 320) is greater than n, the test controller will select n new intermediate versions (block 332) and test the n new intermediate versions (block 334). As noted, because this is an iterative process, the test controller will N'' versions, N''' versions, N'''' versions, etc. until the sample size calculated (block 320) is not greater than n. The iterative nature (block 340) of this process is such that N'' versions, N''' versions, N'''' versions, etc. are treated the same way as N' versions.

If the sample size calculated (block 320) is not greater than n, the test controller will run N'' versions (or N''' versions, N'''' versions, etc. depending on the number of iterations). The test controller will also identify a passed version (block 354) and identify a failed version (block 356), wherein the passed version (block 354) and the failed version (block 356) are consecutive versions of the N'' versions (or N''' versions, N'''' versions, etc. depending on the number of iterations).

Figure 4:
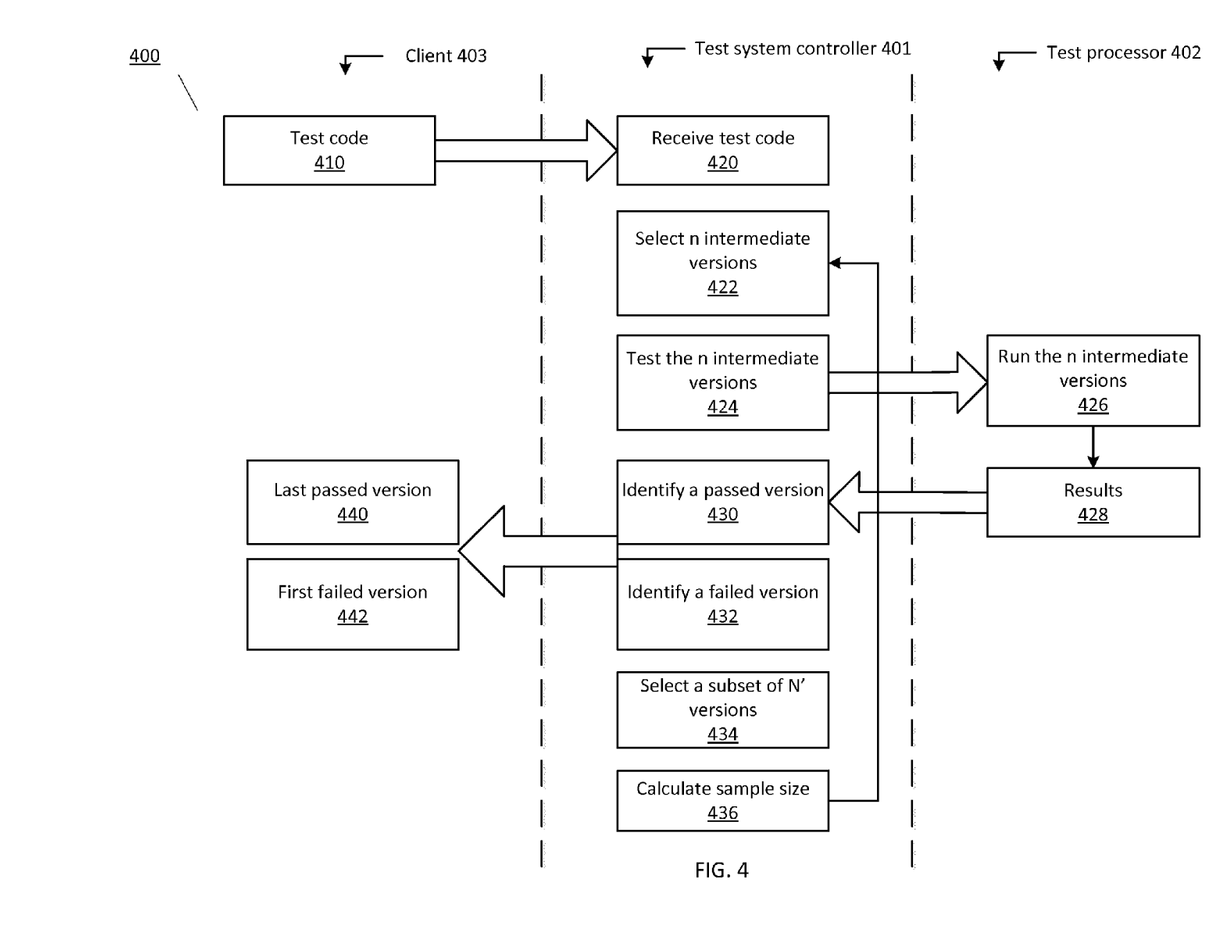
FIG. 4 is a flow diagram illustrating an example method of history revision testing for locating a software property according to an example embodiment of the present disclosure.

FIG. 4 depicts a flow diagram illustrating an example method 400 of history revision testing for locating a software property according to an example embodiment of the present disclosure. Although the example method is described with reference to the flow diagram illustrated in FIG. 4, it will be appreciated that many other methods of performing the acts associated with the method may be used. For example, the order of some of the blocks may be changed, certain blocks may be combined with other blocks, and some of the blocks described are optional. The method may be performed by processing logic that may comprise hardware (e.g., circuitry, dedicated logic, etc.), software, or a combination of both.

The example method of history revision testing starts with a client 403 providing a test code 410. The test code 410 may have a plurality of versions. The test code 410 is sent to the test system controller 401. The test system controller 401 receives the test code (block 420). The test system controller 401 then selects n intermediate versions (block 422). The n intermediate versions are then tested (block 424). The test system controller 401 will send the n intermediate versions to the test processor 402. The test processor 402 then runs the n intermediate versions (block 426). The test processor 402 generates results (block 428) for each of the n intermediate versions. The results are then sent from the test processor 402 to the test system controller 401. The test system controller 401 will identify a passed version (block 430) and identify a failed version (block 432). The test system controller 401 will also select a subset of N' versions (block 434), this subset of N' versions comprising the passed version, the failed version, and all N versions between the passed version and the failed version. The test system controller 401 will calculate a sample size for the subset of N' versions (block 436). The test system controller 401 will automatically perform at least a plurality of iterations, until the sample size is not greater than n. Eventually, when the passed version (block 430) and the failed version (block 432) are consecutive versions, the test system controller 401 will send the last passed version of the test code (block 440) and the first failed version of the test code (block 442) to the client 403.

In an example embodiment, the selection of n, as the quantity of intermediate versions, includes determining a processing capability and selecting a value for n, responsive to the processing capability, such that n is optimized based on the processing capability. The test system controller 401 dynamically adjusts the n, such that the additional test processors are optimized, but not overloaded. This ensures an efficient allocation of resources.

In an example embodiment, the selection of n, as the quantity of intermediate versions of the test code, includes determining a processing time and selecting a value for n, responsive to the processing capability and the processing time, such that n is optimized based on the processing capability and the processing time.

In an example embodiment, when revision history is linear and testing is not limited by either processing capability or processing time, the selection of n, as the quantity of intermediate versions, further comprises determining n, as the quantity of intermediate versions, by the heuristic relationship of $n^n = N$, where N is the total number of versions to be tested. This heuristic relationship assumes that the testing would not encounter any timeouts or failed versions (i.e., all tested versions would run properly). If it is expected that testing will yield timeouts for intermediate versions, the total number of intermediate versions that should be tested, to achieve optimum results, would increase accordingly.

In an example embodiment, at least some of the intermediate versions, the new intermediate versions, and the N' versions are sent by the test system controller 401 to the additional test processors. The additional test processors are configured to run at least some of the intermediate versions, the new intermediate versions, and the N' versions in parallel. With increased processing resources, such as the external test system controller, the server, and the cloud, the number of n intermediate versions that can be tested in parallel likewise increases.

In an example embodiment, testing the test code, by any of the test system controller 401 or the additional test processors (e.g., the external test system controller, the server, and the cloud) includes running intermediate versions simultaneously and in parallel with each other, running new intermediate versions simultaneously and in parallel with each other, and running N'' versions simultaneously and in parallel with each other.

In an example embodiment, a user can select a particular group of the N versions of test code, such that all N versions not in the particular group selected by the user are not tested by the test system controller 401. The user can communicate this selection from a client or additional clients, via the network. In this way, the user is able to target specific versions or areas of test code, further optimizing property location time.

In an example embodiment, once a passed version is identified, the test system controller 401 automatically ceases the running of the intermediate versions chronologically prior to the passed version. In other words, the property is located at a version after the passed version, such that all versions before the passed version can be expected to pass. By ceasing the testing of these versions chronologically prior to the passed version, the system advantageously conserves computing resources. Likewise, once a failed version is identified, the test system controller 401 automatically ceases the running of the intermediate versions chronologically subsequent to the failed version. In other words, the property is located either at the failed version or at a version before the failed version, such that all versions after the failed version can be expected to fail. By ceasing the testing of these versions chronologically subsequent to the failed version, the system advantageously conserves computing resources.

In a similarly related example embodiment, once a passed version and a failed version are identified, the test system controller 401 automatically determines whether the passed version and the failed version are consecutive versions, and responsive to the passed version and the failed version being consecutive versions, the test system controller 401 automatically ceases the running of all intermediate versions. In other words, once consecutive versions of passed and failed versions have been located, it is no longer necessary to test other intermediate versions in that subset. This can advantageously improve processing speed and processing usage for additional test processors by ceasing any testing which is no longer required by the test system controller 401.

Figure 5:
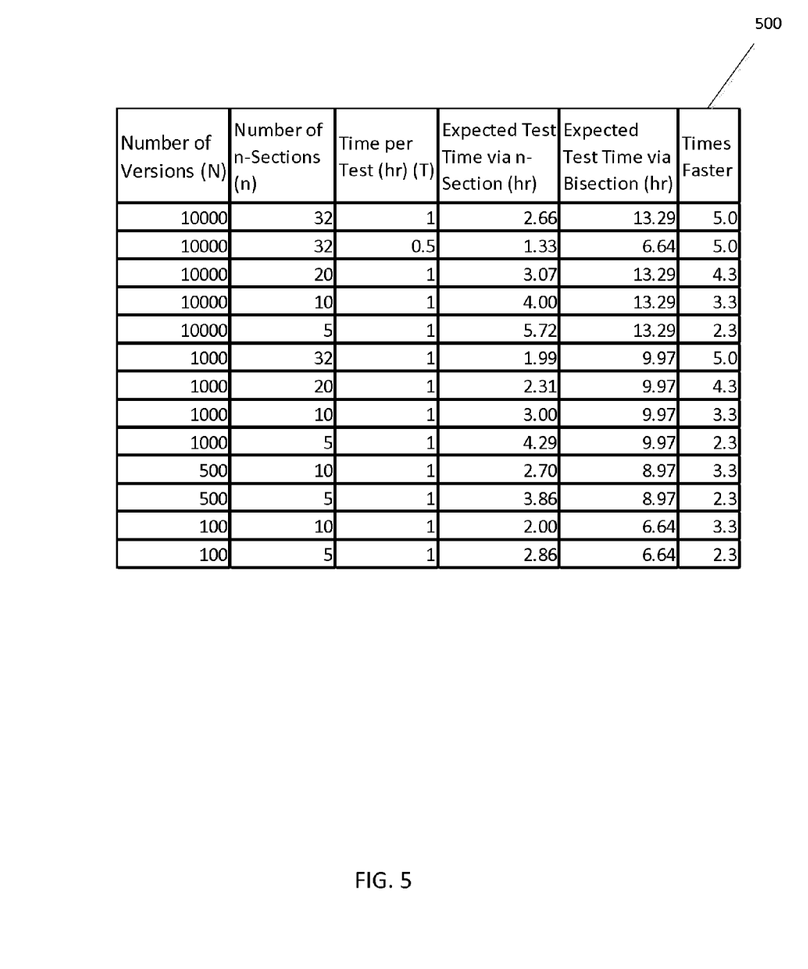
FIG. 5 is a data table illustrating an example of approximated test times for bisection and n-section methods for property location according to an example embodiment of the present disclosure.

FIG. 5 depicts a data table illustrating an example of approximated test times for bisection and n-section methods for property location according to an example embodiment of the present disclosure. For the purposes of example, included in the data table 500 is an exemplary set of hypothetical values which may be used to approximate the ideal test time to locate a property. The "Number of Versions" (N) is the quantity of different versions of software in which a property may be located. The "Number of n-Sections" (n) is the quantity of intermediate versions that can be tested, in parallel, for the property. The "Time per Test (hr)" (T) is a normative amount of time (e.g., the average number of hours) it takes to test one version for the property.

The data table 500 also includes a calculation for the "Expected Test Time via Bisection." The "Expected Test Time via Bisection" is representative of the ideal time it would take to locate the version of software with the property, given N versions of software, each version taking a normative amount of time (time per Test), when two sections are tested in parallel. Bisection is one approach to isolating the software property. In some example embodiments, the software property is a software defect, which must be located to fix the software defect. In other example embodiments, the software property is a software property is a software feature that is desirable, and may be used elsewhere in other portions of software or code.

Given two points in a project history (e.g., good and bad), bisection utilizes a binary search to find the first point in a set of versions where the software property exists. Reverting to the version just prior to the version with the software property may be helpful. In an example, if the software property is a software defect, reverting to the version just prior to the version with the software property will give the user a version that does not have the software defect. Alternatively, if the number of versions N is large, and testing each version takes a long time T, this process can take very long. The total bisection time t can be expressed as:

$$t = T * \frac{\log_{10}(N)}{\log_{10}(2)}$$

According to the present disclosure, the total number of changes N is split into at least three segments. In other words, the history can be split into three or more segments, where n intermediate versions intersecting these three or more segments are selected. The intermediate versions are tested, in parallel. Once all intermediate versions have been tested, the first bad version and the last good version are selected, and the process is repeated.

With this new process, if the number of versions N is large, and testing each version takes a long time T, the process can be shortened. By testing n intermediate versions in parallel, the total n-section time t can be noted at:

$$t = T * \frac{\log_{10}(N)}{\log_{10}(n)}$$

Using these values, the "Expected Test Time via n-Section (hr)" can be calculated. This is representative of the expected time it would take to locate the version of the software with the property, given N versions of software, each version taking a normative amount of time (Time per Test), when n-sections are tested in parallel.

Data table 500 also includes notation for approximately how much faster n-section testing is, when compared to bisection testing. For example, with 10000 versions, and 32 n-sections, with each test taking one hour to complete, n-section testing is expected to locate the version with the property in approximately 2.66 hours. Bisection, by comparison, is expected locate the version with the property in approximately 13.29 hours. In this example, n-section testing is five-times faster than bisection testing at locating the property.

It should be noted that the calculated expected test times, both for n-section and bisection, are based on normative test times to provide example data for illustrative purposes. In other words, if three iterative tests which each take one hour to complete, the sequence of tests will never finish in 2.66 hours. Rather, the test may finish in two hours, some of the time, and three hours some of the time. In this way, the expected test times can be understood to indicate probability. For example, if a particular test is expected to take 3.07 hours, the test may finish in three hours almost all of the time; and only occasionally take four hours to finish. However, in practice, the actual test times will typically not all be equal to the normative test times, which may, for example, be based on an average, median, or mode test time. Thus, in an example with a normative test time of one hour, the actual test time does not have to be an exact multiple of one hour.

Additionally, it should be noted that while the information for expected test time is helpful for comparison purposes, the actual test time could be significantly higher. For example, there could be delays, or failures, with the testing of the individual versions. With bisection, if there is a failure while testing a version, the test produces no useful information. In other words, the test system controller has no indication of whether the property is located in one of the versions "before" or "after" the currently version. By comparison, with n-section, even if there is a failure while testing a version, the n−1 other versions are being tested in parallel such that any of the n−1 other versions can still produce usable test information (e.g., pass/fail). As long as some usable test information is produced from at least one of the versions, the n-section process will be able to nonetheless converge on the property based off of whatever test information has been provided. Therefore, beyond merely improving the test time, whenever there are testing delays or failures, n-section becomes even more beneficial.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first example aspect of the present disclosure, a method of regression testing for locating a software property, comprises receiving a test code, the test code having N versions in chronological order, wherein N is a quantity of versions. The method further comprises selecting n intermediate versions of the test code, wherein n is a quantity of intermediate versions. The method further comprises testing the test code using history revision testing. The history revision testing comprises running the intermediate versions in parallel. The history revision testing further comprises identifying a first passed version, the first passed version being a last intermediate version of the intermediate versions to pass the test. The history revision testing further comprises identifying a first failed version, the first failed version being a first intermediate version of the intermediate versions to fail the test, such that the first passed version and the first failed version are consecutive versions of the intermediate versions. The history revision testing further comprises selecting a subset of the N versions, the subset including N' versions, the N' versions comprising all versions of the N versions between the first passed version and the first failed version, including the first passed version and the first failed version. The history revision testing further comprises calculating a sample size, the sample size being calculated as a total number of N' versions. The history revision testing further comprises determining whether the sample size is greater than n. Responsive to determining that sample size is greater than n, the history revision testing further comprises selecting n new intermediate versions of the test code from the N' versions and testing the new intermediate versions using history revision testing. Testing the new intermediate versions using history revision testing comprises running the new intermediate versions in parallel. Testing the new intermediate versions using history revision testing further comprises identifying a second passed version, the second passed version being a last new intermediate version of the new intermediate versions to pass the test. Testing the new intermediate versions using history revision testing further comprises identifying a second failed version, the second failed version being a first new intermediate version of the new intermediate versions to fail the test, such that the second passed version and the second failed version are consecutive versions of the new intermediate versions. Testing the new intermediate versions using history revision testing further comprises selecting a subset of the N' versions, the subset including N" versions, the N" versions comprising all versions of the N' versions between the second passed version and the second failed version, including the second passed version and the second failed version. Testing the new intermediate versions using history revision testing further comprises recalculating the sample size, the sample size being recalculated as a total number of N" versions. Testing the new intermediate versions using history revision testing further comprises, after recalculating the sample size, determining whether the sample size is greater than n. The method further includes automatically performing at least a plurality of iterations of selecting and testing, including selecting and testing the intermediate versions and the new intermediate versions. Responsive to determining that the sample size is not greater than n, the method further includes running the N" versions in parallel. The method further includes identifying a third passed version, the third passed version being a last version of the N" versions to pass the test. The method further includes identifying a third failed version, the third failed version being a first version of the N" versions to fail the test, such that the third passed version and the third failed version are consecutive versions of the N" versions, wherein the third failed version is a first version of the N versions that includes the software property.

In accordance with another example aspect of the present disclosure, which may be used in combination with any one or more of the preceding aspects, the plurality of iterations further includes at least selecting n second new intermediate versions of the test code from the N" versions and testing the second new intermediate versions using history revision testing. The history revision testing comprising running the second new intermediate versions in parallel. The history revision testing further comprising identifying a fourth passed version, the fourth passed version being a last second new intermediate version of the second new intermediate versions to pass the test. The history revision testing further comprising identifying a fourth failed version, the fourth failed version being a first second new intermediate version of the second new intermediate versions to fail the test, such that the fourth passed version and the fourth failed version are consecutive versions of the second new intermediate versions. The history revision testing further comprising selecting a subset of the N" versions, the subset including N'" versions, the N'" versions comprising all versions of the N" versions between the fourth passed version and the fourth failed version, including the fourth passed version and the fourth failed version. The history revision testing further comprising recalculating the sample size, the sample size being recalculated as a total number of N'" versions. The history revision testing further comprising, after recalculating the sample size, determining whether the sample size is greater than n.

In accordance with another example aspect of the present disclosure, which may be used in combination with any one or more of the preceding aspects, the selection of the intermediate versions of the test code further comprises determining a number of changes for each of the N versions of the test code and selecting intermediate versions of the test code, wherein each of the intermediate versions has an equivalent number of changes.

In accordance with another example aspect of the present disclosure, which may be used in combination with any one or more of the preceding aspects, the selection of n, as the quantity of intermediate versions, further comprises determining a processing capability and selecting a value for n, responsive to the processing capability, such that n is optimized based on the processing capability.

In accordance with another example aspect of the present disclosure, which may be used in combination with any one or more of the preceding aspects, the selection of n, as the quantity of intermediate versions of the test code, further comprises determining a processing time and selecting a value for n, responsive to the processing capability and the processing time, such that n is optimized based on the processing capability and the processing time.

In accordance with another example aspect of the present disclosure, which may be used in combination with any one or more of the preceding aspects, the selection of n, as the quantity of intermediate versions, includes utilizing the relationship of $n''=N$.

In accordance with another example aspect of the present disclosure, which may be used in combination with any one or more of the preceding aspects, at least some of the intermediate versions, the new intermediate versions, and the N' versions are sent to a plurality of additional test processors.

In accordance with another example aspect of the present disclosure, which may be used in combination with any one or more of the preceding aspects, the plurality of additional test processors run at least some of the intermediate versions, the new intermediate versions, and the N' versions simultaneously and in parallel.

In accordance with another example aspect of the present disclosure, which may be used in combination with any one or more of the preceding aspects, testing the test code includes: running intermediate versions simultaneously and in parallel with each other; running new intermediate versions simultaneously and in parallel with each other; and running N" versions simultaneously and in parallel with each other.

In accordance with another example aspect of the present disclosure, which may be used in combination with any one or more of the preceding aspects, the software property is one of a software feature and a software defect.

In accordance with another example aspect of the present disclosure, which may be used in combination with any one or more of the preceding aspects, running versions of test code includes compiling the source code for the versions of test code.

In accordance with another example aspect of the present disclosure, which may be used in combination with any one or more of the preceding aspects, a plurality of previously tested versions, which have already been tested and identified as passed or failed, do not need to be tested again.

In accordance with another example aspect of the present disclosure, which may be used in combination with any one or more of the preceding aspects, the testing further comprises determining whether the sample size of the N" versions is greater than n+2, wherein the plurality of previously tested versions are included in the N" versions.

In a second example aspect of the present disclosure, a system for locating a software property comprises a memory, one or more processors, in communication with the memory, a user interface, in communication with the one or more processors, and a test system controller. The test system controller is configured to receive a test code, the test code having N versions in chronological order, wherein N is a quantity of versions. The test system controller is further configured to select n intermediate versions of the test code, wherein n is a quantity of intermediate versions. The test system controller is further configured to test the test code using history revision testing. The history revision testing comprises running the intermediate versions in parallel. The history revision testing further comprises identifying a first passed version, the first passed version being a last intermediate version of the intermediate versions to pass the test. The history revision testing further comprises identifying a first failed version, the first failed version being a first intermediate version of the intermediate versions to fail the test, such that the first passed version and the first failed version are consecutive versions of the intermediate versions. The history revision testing further comprises selecting a subset of the N versions, the subset including N' versions, the N' versions comprising all versions of the N versions between the first passed version and the first failed version, including the first passed version and the first failed version. The history revision testing further comprises calculating a sample size, the sample size being calculated as a total number of N' versions. The history revision testing further comprises determining whether the sample size is greater than n. Responsive to determining that sample size is greater than n, the history revision testing further comprises selecting n new intermediate versions of the test code from the N' versions and testing the new intermediate versions using history revision testing. Testing the new intermediate versions using history revision testing comprises running the new intermediate versions in parallel. Testing the new intermediate versions using history revision testing further comprises identifying a second passed version, the second passed version being a last new intermediate version of the new intermediate versions to pass the test. Testing the new intermediate versions using history revision testing further comprises identifying a second failed version, the second failed version being a first new intermediate version of the new intermediate versions to fail the test, such that the second passed version and the second failed version are consecutive versions of the new intermediate versions. Testing the new intermediate versions using history revision testing further comprises selecting a subset of the N' versions, the subset including N" versions, the N" versions comprising all versions of the N' versions between the second passed version and the second failed version, including the second passed version and the second failed version. Testing the new intermediate versions using history revision testing further comprises recalculating the sample size, the sample size being recalculated as a total number of N" versions. Testing the new intermediate versions using history revision testing further comprises, after recalculating the sample size, determining whether the sample size is greater than n. The test system controller is further configured to automatically perform at least a plurality of iterations of selecting and testing, including selecting and testing the intermediate versions and the new intermediate versions. Responsive to determining that the sample size is not greater than n, the test system controller is further configured to run the N" versions in parallel. The test system controller is further configured to identify a third passed version, the third passed version being a last version of the N" versions to pass the test. The test system controller is further configured to identify a third failed version, the third failed version being a first version of the N" versions to fail the test, such that the third passed version and the third failed version are consecutive versions of the N" versions, wherein the third failed version is a first version of the N versions that includes the software property.

In accordance with another example aspect of the present disclosure, which may be used in combination with any one or more of the preceding aspects, the system further comprises a plurality of additional test processors in communication with the test system controller, and wherein the plurality of additional test processors is used to run the intermediate versions, the new intermediate versions, and the N' versions.

In accordance with another example aspect of the present disclosure, which may be used in combination with any one or more of the preceding aspects, the additional test processors comprise at least one of an external test system controller, a server, or a cloud.

In accordance with another example aspect of the present disclosure, which may be used in combination with any one or more of the preceding aspects, the test system controller dynamically adjusts an amount of the intermediate versions, the new intermediate versions, and the N' versions, this adjustment configured to optimize the usage of the plurality of additional test processors.

In accordance with another example aspect of the present disclosure, which may be used in combination with any one or more of the preceding aspects, a user can select a particular group of the N versions of test code, such that all N versions not in the particular group are not tested by the test system controller.

In accordance with another example aspect of the present disclosure, which may be used in combination with any one or more of the preceding aspects, once a passed version is identified, the system automatically ceases the running of the intermediate versions chronologically prior to the passed version.

In accordance with another example aspect of the present disclosure, which may be used in combination with any one or more of the preceding aspects, once a failed version is identified, the system automatically ceases the running of the intermediate versions chronologically subsequent to the failed version.

In accordance with another example aspect of the present disclosure, which may be used in combination with any one or more of the preceding aspects, once a passed version and a failed version are identified, the system automatically determines whether the passed version and the failed version are consecutive versions, and wherein responsive to the passed version and the failed version being consecutive versions, the system automatically ceases the running of all intermediate versions.

In a third example aspect of the present disclosure, a computer-readable medium storing instructions are configured to cause a test system controller to receive a test code, the test code having N versions in chronological order, wherein N is a quantity of versions. The test system controller is further configured to select n intermediate versions of the test code, wherein n is a quantity of intermediate versions. The test system controller is further configured to test the test code using history revision testing. The history revision testing comprises running the intermediate versions in parallel. The history revision testing further comprises identifying a first passed version, the first passed version being a last intermediate version of the intermediate versions to pass the test. The history revision testing further comprises identifying a first failed version, the first failed version being a first intermediate version of the intermediate versions to fail the test, such that the first passed version and the first failed version are consecutive versions of the intermediate versions. The history revision testing further comprises selecting a subset of the N versions, the subset including N' versions, the N' versions comprising all versions of the N versions between the first passed version and the first failed version, including the first passed version and the first failed version. The history revision testing further comprises calculating a sample size, the sample size being calculated as a total number of N' versions. The history revision testing further comprises determining whether the sample size is greater than n. Responsive to determining that sample size is greater than n, the history revision testing further comprises selecting n new intermediate versions of the test code from the N' versions and testing the new intermediate versions using history revision testing. Testing the new intermediate versions using history revision testing comprises running the new intermediate versions in parallel. Testing the new intermediate versions using history revision testing further comprises identifying a second passed version, the second passed version being a last new intermediate version of the new intermediate versions to pass the test. Testing the new intermediate versions using history revision testing further comprises identifying a second failed version, the second failed version being a first new intermediate version of the new intermediate versions to fail the test, such that the second passed version and the second failed version are consecutive versions of the new intermediate versions. Testing the new intermediate versions using history revision testing further comprises selecting a subset of the N' versions, the subset including N" versions, the N" versions comprising all versions of the N' versions between the second passed version and the second failed version, including the second passed version and the second failed version. Testing the new intermediate versions using history revision testing further comprises recalculating the sample size, the sample size being recalculated as a total number of N" versions. Testing the new intermediate versions using history revision testing further comprises, after recalculating the sample size, determining whether the sample size is greater than n. The test system controller is further configured to automatically perform at least a plurality of iterations of selecting and testing, including selecting and testing the intermediate versions and the new intermediate versions. Responsive to determining that the sample size is not greater than n, the test system controller is further configured to run the N" versions in parallel. The test system controller is further configured to identify a third passed version, the third passed version being a last version of the N" versions to pass the test. The test system controller is further configured to identify a third failed version, the third failed version being a first version of the N" versions to fail the test, such that the third passed version and the third failed version are consecutive versions of the N" versions, wherein the third failed version is a first version of the N versions that includes the software property.

In accordance with another example aspect of the present disclosure, which may be used in combination with any one or more of the preceding aspects, once a passed version is identified, the system controller automatically ceases the running of the intermediate versions chronologically prior to the passed version.

In accordance with another example aspect of the present disclosure, which may be used in combination with any one or more of the preceding aspects, once a failed version is identified, the system controller automatically ceases the running of the intermediate versions chronologically subsequent to the failed version.

In accordance with another example aspect of the present disclosure, which may be used in combination with any one or more of the preceding aspects, once a passed version and a failed version are identified, the system controller automatically determines whether the passed version and the failed version are consecutive versions, and wherein responsive to the passed version and the failed version being consecutive versions, the system controller automatically ceases the running of all intermediate versions.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of history revision testing for locating a software property, the method comprising:
   receiving a test code, the test code having N versions in chronological order, wherein N is a quantity of versions;

selecting n intermediate versions of the test code, wherein n is a quantity of intermediate versions; and testing the test code using history revision testing that comprises:

running the intermediate versions in parallel;

identifying a first passed version, the first passed version being a last intermediate version of the intermediate versions to pass the test;

identifying a first failed version, the first failed version being a first intermediate version of the intermediate versions to fail the test, such that the first passed version and the first failed version are consecutive versions of the intermediate versions;

selecting a subset of the N versions, the subset including N' versions, the N' versions comprising all versions of the N versions between the first passed version and the first failed version, including the first passed version and the first failed version;

calculating a sample size, the sample size being calculated as a total number of N' versions;

determining whether the sample size is greater than n;

responsive to determining that sample size is greater than n:

selecting n new intermediate versions of the test code from the N' versions; and testing the new intermediate versions using history revision testing that comprises:

running the new intermediate versions in parallel;

identifying a second passed version, the second passed version being a last new intermediate version of the new intermediate versions to pass the test;

identifying a second failed version, the second failed version being a first new intermediate version of the new intermediate versions to fail the test, such that the second passed version and the second failed version are consecutive versions of the new intermediate versions;

selecting a subset of the N' versions, the subset including N" versions, the N" versions comprising all versions of the N' versions between the second passed version and the second failed version, including the second passed version and the second failed version;

recalculating the sample size, the sample size being recalculated as a total number of N" versions; and after recalculating the sample size, determining whether the sample size is greater than n;

automatically performing at least a plurality of iterations of selecting and testing, including selecting and testing the intermediate versions and the new intermediate versions; and responsive to determining that the sample size is not greater than n:

running the N" versions in parallel;

identifying a third passed version, the third passed version being a last version of the N" versions to pass the test; and identifying a third failed version, the third failed version being a first version of the N" versions to fail the test, such that the third passed version and the third failed version are consecutive versions of the N" versions, wherein the third failed version is a first version of the N versions that includes the software property.

2. The method of claim 1, wherein the plurality of iterations further includes at least:

selecting n second new intermediate versions of the test code from the N" versions; and testing the second new intermediate versions using history revision testing that comprises:

running the second new intermediate versions in parallel;

identifying a fourth passed version, the fourth passed version being a last second new intermediate version of the second new intermediate versions to pass the test;

identifying a fourth failed version, the fourth failed version being a first second new intermediate version of the second new intermediate versions to fail the test, such that the fourth passed version and the fourth failed version are consecutive versions of the second new intermediate versions;

selecting a subset of the N" versions, the subset including N'" versions, the N'" versions comprising all versions of the N" versions between the fourth passed version and the fourth failed version, including the fourth passed version and the fourth failed version;

recalculating the sample size, the sample size being recalculated as a total number of N'" versions; and after recalculating the sample size, determining whether the sample size is greater than n.

3. The method of claim 1, wherein the selection of the intermediate versions of the test code further comprises:

determining a number of changes for each of the N versions of the test code; and selecting intermediate versions of the test code, wherein each of the intermediate versions has an equivalent number of changes.

4. The method of claim 1, wherein the selection of n, as the quantity of intermediate versions, further comprises:

determining a processing capability; and selecting a value for n, responsive to the processing capability, such that n is optimized based on the processing capability.

5. The method of claim 1, wherein the selection of n, as the quantity of intermediate versions, includes utilizing the relationship of $n^n = N$.

6. The method of claim 1, wherein at least some of the intermediate versions, the new intermediate versions, and the N' versions are sent to a plurality of additional test processors.

7. The method of claim 6, wherein the plurality of additional test processors run at least some of the intermediate versions, the new intermediate versions, and the N' versions simultaneously and in parallel.

8. The method of claim 1, wherein testing the test code includes:

running intermediate versions simultaneously and in parallel with each other;

running new intermediate versions simultaneously and in parallel with each other; and running N" versions simultaneously and in parallel with each other.

9. The method of claim 1, wherein the software property is one of a software feature and a software defect.

10. The method of claim 1, wherein a plurality of previously tested versions, which have already been tested and identified as passed or failed, do not need to be tested again.

11. The method of claim 10, the testing further comprising determining whether the sample size of the N" versions is greater than n+2, wherein the plurality of previously tested versions are included in the N" versions.

12. A system for locating a software property, the system comprising:
 a memory;
 one or more processors, in communication with the memory;
 a user interface, in communication with the one or more processors; and
 a test system controller, configured to:
  receive a test code, the test code having N versions in chronological order, wherein N is a quantity of versions;
  select n intermediate versions of the test code, wherein n is a quantity of intermediate versions; and
  test the test code using history revision testing, which comprises:
   running the intermediate versions in parallel;
   identifying a first passed version, the first passed version being a last intermediate version of the intermediate versions to pass the test;
   identifying a first failed version, the first failed version being a first intermediate version of the intermediate versions to fail the test, such that the first passed version and the first failed version are consecutive versions of the intermediate versions;
   selecting a subset of the N versions, the subset including N' versions, the N' versions comprising all versions of the N versions between the first passed version and the first failed version, including the first passed version and the first failed version;
   calculating a sample size, the sample size being calculated as a total number of N' versions;
   determining whether the sample size is greater than n;
   responsive to determining that sample size is greater than n:
    selecting n new intermediate versions of the test code from the N' versions; and
    testing the new intermediate versions using history revision testing that comprises:
     running the new intermediate versions in parallel;
     identifying a second passed version, the second passed version being a last new intermediate version of the new intermediate versions to pass the test;
     identifying a second failed version, the second failed version being a first new intermediate version of the new intermediate versions to fail the test, such that the second passed version and the second failed version are consecutive versions of the new intermediate versions;
     selecting a subset of the N' versions, the subset including N" versions, the N" versions comprising all versions of the N' versions between the second passed version and the second failed version, including the second passed version and the second failed version;
     recalculating the sample size, the sample size being recalculated as a total number of N" versions; and
     after recalculating the sample size, determining whether the sample size is greater than n;
   automatically perform at least a plurality of iterations of selecting and testing, including selecting and testing the intermediate versions and the new intermediate versions; and
   responsive to determining that the sample size is not greater than n:
    running the N" versions in parallel;
    identifying a third passed version, the third passed version being a last version of the N" versions to pass the test; and
    identifying a third failed version, the third failed version being a first version of the N" versions to fail the test, such that the third passed version and the third failed version are consecutive versions of the N" versions,
    wherein the third failed version is a first version of the N versions that includes the software property.

13. The system of claim 12, further comprising a plurality of additional test processors, which are in communication with the test system controller, wherein the plurality of additional test processors is used to run the intermediate versions, the new intermediate versions, and the N" versions.

14. The system of claim 13, wherein the additional test processors comprise at least one of an external test system controller, a server, or a cloud.

15. The system of claim 14, wherein the test system controller dynamically adjusts an amount of the intermediate versions, the new intermediate versions, and the N" versions, this adjustment configured to optimize the usage of the plurality of additional test processors.

16. The system of claim 12, wherein a user can select a particular group of the N versions of test code, such that all N versions not in the particular group are not tested by the test system controller.

17. The system of claim 12, wherein once a passed version is identified, the system automatically ceases the running of the intermediate versions chronologically prior to the passed version.

18. The system of claim 12, wherein once a failed version is identified, the system automatically ceases the running of the intermediate versions chronologically subsequent to the failed version.

19. The system of claim 12, wherein once a passed version and a failed version are identified, the system automatically determines whether the passed version and the failed version are consecutive versions, and wherein responsive to the passed version and the failed version being consecutive versions, the system automatically ceases the running of all intermediate versions.

20. A computer readable medium storing instructions, which when executed by a test system controller, cause the test system controller to:
 receive a test code, the test code having N versions in chronological order, wherein N is a quantity of versions;
 select n intermediate versions of the test code, wherein n is a quantity of intermediate versions; and
 test the test code using history revision testing, which comprises:
  running the intermediate versions in parallel;
  identifying a first passed version, the first passed version being a last intermediate version of the intermediate versions to pass the test;
  identifying a first failed version, the first failed version being a first intermediate version of the intermediate versions to fail the test, such that the first passed version and the first failed version are consecutive versions of the intermediate versions;
  selecting a subset of the N versions, the subset including N' versions, the N' versions comprising all versions of the N versions between the first passed version and the first failed version, including the first passed version and the first failed version;

calculating a sample size, the sample size being calculated as a total number of N' versions;
determining whether the sample size is greater than n;
responsive to determining that sample size is greater than n:
   selecting n new intermediate versions of the test code from the N' versions; and
   testing the new intermediate versions using history revision testing that comprises:
      running the new intermediate versions in parallel;
      identifying a second passed version, the second passed version being a last new intermediate version of the new intermediate versions to pass the test;
      identifying a second failed version, the second failed version being a first new intermediate version of the new intermediate versions to fail the test, such that the second passed version and the second failed version are consecutive versions of the new intermediate versions;
      selecting a subset of the N' versions, the subset including N" versions, the N" versions comprising all versions of the N' versions between the second passed version and the second failed version, including the second passed version and the second failed version;
      recalculating the sample size, the sample size being recalculated as a total number of N" versions; and
      after recalculating the sample size, determining whether the sample size is greater than n;
   automatically perform at least a plurality of iterations of selecting and testing, including selecting and testing the intermediate versions and the new intermediate versions; and
responsive to determining that the sample size is not greater than n:
   running the N" versions in parallel;
   identifying a third passed version, the third passed version being a last version of the N" versions to pass the test; and
   identifying a third failed version, the third failed version being a first version of the N" versions to fail the test, such that the third passed version and the third failed version are consecutive versions of the N" versions,
wherein the third failed version is a first version of the N versions that includes the software property.

* * * * *